(12) United States Patent
Desfosses et al.

(10) Patent No.: US 10,287,979 B2
(45) Date of Patent: May 14, 2019

(54) SPLIT INTERMEDIATE CASE

(71) Applicant: United Technologies Corporation, Hartford, CT (US)

(72) Inventors: Brian Desfosses, Vernon, CT (US); Willoughby Marshall Quin, North Haven, CT (US)

(73) Assignee: United Technologies Corporation, Farmington, CT (US)

( * ) Notice: Subject to any disclaimer, the term of this patent is extended or adjusted under 35 U.S.C. 154(b) by 1395 days.

(21) Appl. No.: 13/674,342

(22) Filed: Nov. 12, 2012

(65) Prior Publication Data
US 2014/0133967 A1 May 15, 2014

(51) Int. Cl.
| | | |
|---|---|---|
| *B22C 9/02* | (2006.01) | |
| *B22C 9/04* | (2006.01) | |
| *F02C 6/08* | (2006.01) | |
| *F02C 7/00* | (2006.01) | |
| *B22D 25/02* | (2006.01) | |
| *F01D 25/24* | (2006.01) | |
| *F04D 17/02* | (2006.01) | |
| *F04D 19/02* | (2006.01) | |
| *F04D 29/02* | (2006.01) | |
| *F04D 29/42* | (2006.01) | |
| *F04D 29/52* | (2006.01) | |

(52) U.S. Cl.
CPC ............... *F02C 7/00* (2013.01); *B22C 9/02* (2013.01); *B22C 9/04* (2013.01); *B22D 25/02* (2013.01); *F01D 25/24* (2013.01); *F02C 6/08* (2013.01); *F04D 17/025* (2013.01); *F04D 19/02* (2013.01); *F04D 29/023* (2013.01); *F04D 29/4206* (2013.01); *F04D 29/522* (2013.01); *F05D 2230/21* (2013.01); *F05D 2230/211* (2013.01); *F05D 2300/171* (2013.01)

(58) Field of Classification Search
CPC ...... F04D 19/02; F04D 17/025; F04D 29/023; F04D 29/4206; F02C 7/00; F02C 6/08; F01D 25/24; F05D 2230/21; F05D 2230/211; B22C 9/04; B22C 9/02; B22D 25/02

See application file for complete search history.

(56) References Cited

U.S. PATENT DOCUMENTS

| | | | | |
|---|---|---|---|---|
| 3,579,805 A | * | 5/1971 | Kast | B23P 11/025 148/529 |
| 4,844,144 A | * | 7/1989 | Murphy | B22C 7/02 164/246 |
| 4,968,216 A | * | 11/1990 | Anderson | F01D 1/16 415/181 |
| 5,503,490 A | * | 4/1996 | Melton | F01D 25/243 403/28 |

(Continued)

OTHER PUBLICATIONS

The International Search Report dated Feb. 21, 2014 for International Application No. PCT/US2013/069093.

*Primary Examiner* — Ninh H. Nguyen
*Assistant Examiner* — Brian P Wolcott
(74) *Attorney, Agent, or Firm* — Kinney & Lange, P.A.

(57) ABSTRACT

An intermediate case (IMC) for use in a compressor section of a gas turbine engine includes a bleed duct and an IMC centerbody. The bleed duct is formed via sand casting. The IMC centerbody is formed via investment casting and is fixedly attached to the bleed duct.

19 Claims, 5 Drawing Sheets

(56) References Cited

U.S. PATENT DOCUMENTS

| | | | | |
|---|---|---|---|---|
| 7,249,929 | B2* | 7/2007 | Cummings | F01D 17/105 |
| | | | | 29/889.22 |
| 8,997,485 | B2* | 4/2015 | Sumser | F01D 9/026 |
| | | | | 415/151 |
| 2007/0264128 | A1 | 11/2007 | Grudnoski et al. | |
| 2008/0240917 | A1 | 10/2008 | Eleftheriou et al. | |
| 2010/0068043 | A1 | 3/2010 | Shteyman et al. | |
| 2010/0242488 | A1* | 9/2010 | Veninger | F23L 7/005 |
| | | | | 60/772 |
| 2010/0247306 | A1* | 9/2010 | Merry | F02C 9/18 |
| | | | | 415/208.2 |
| 2012/0070271 | A1* | 3/2012 | Urban | F02C 6/08 |
| | | | | 415/145 |
| 2012/0159966 | A1 | 6/2012 | Suciu et al. | |

* cited by examiner

SPLIT INTERMEDIATE CASE

BACKGROUND

The present invention relates to gas turbine engines, and in particular, to an intermediate case for use in a gas turbine engine. Gas turbine engines typically include one or more compressor sections, a combustor section, and one or more turbine sections. Some gas turbine engines include multiple compressor sections spaced by an intermediate case (IMC). IMCs can have shapes that can be challenging to manufacture, particularly considering various design requirements including weight, size, finish, strength, tolerance precision, as well as other possible requirements. This can cause IMCs to be relatively costly, time consuming, and challenging to manufacture.

SUMMARY

According to the present invention, an intermediate case (IMC) for use in a compressor section of a gas turbine engine includes a bleed duct and an IMC centerbody. The bleed duct is formed via sand casting. The IMC centerbody is formed via investment casting and is fixedly attached to the bleed duct.

Another embodiment is a method for forming an intermediate case (IMC) for use in a compressor section of a gas turbine engine. The method includes forming a bleed duct via sand casting, forming an IMC centerbody by investment casting, and fixedly attaching the IMC centerbody to the bleed duct.

DETAILED DESCRIPTION

Figure 1:
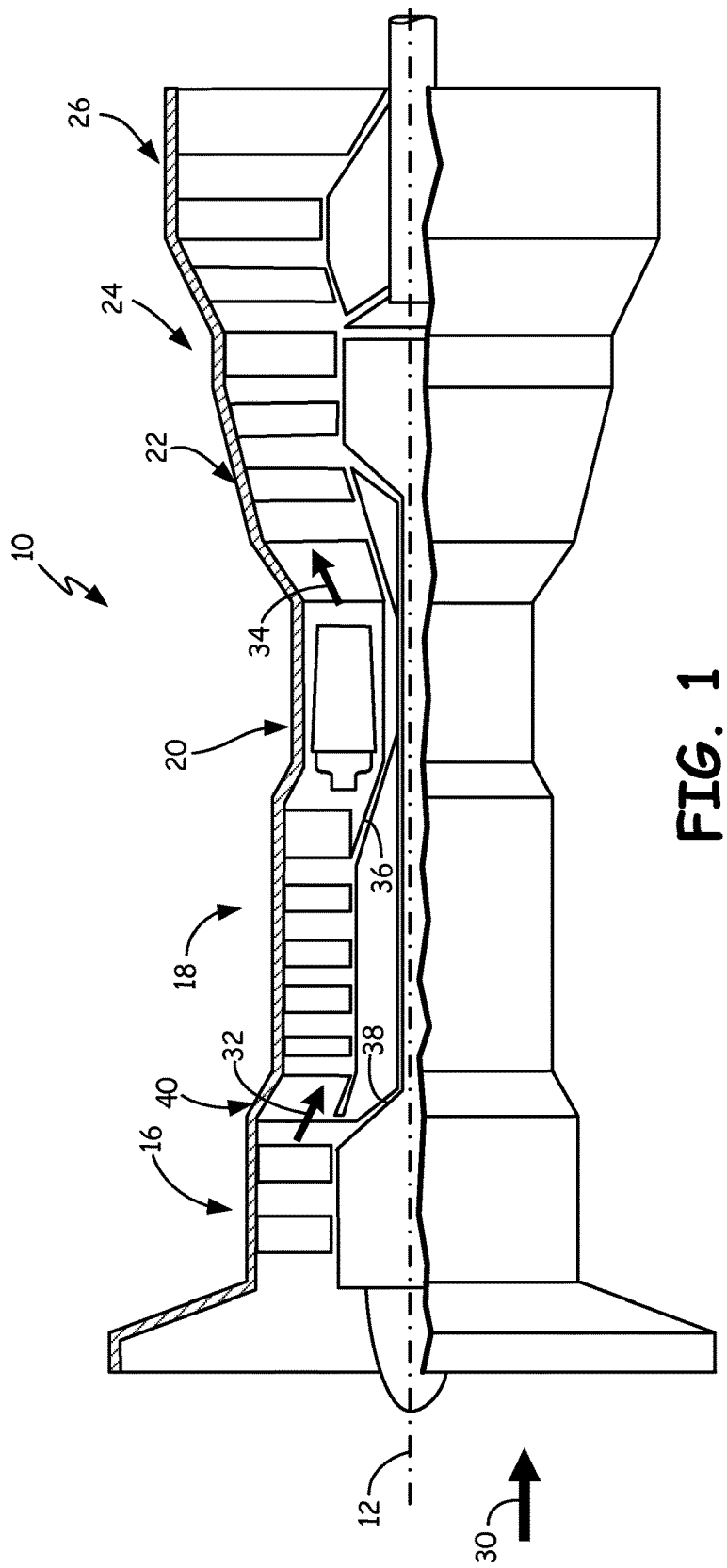
FIG. 1 is a side sectional schematic view of an industrial gas turbine engine.

FIG. 1 is a side partial sectional schematic view of gas turbine engine 10. In the illustrated embodiment, gas turbine engine 10 is an industrial gas turbine engine circumferentially disposed about a central, longitudinal axis or axial engine centerline axis 12 as illustrated in FIG. 1. Gas turbine engine 10 includes in series order from front to rear, low pressure compressor section 16, high pressure compressor section 18, combustor section 20, high pressure turbine section 22, and low pressure turbine section 24. In some embodiments, power turbine section 26 is a free turbine section disposed aft of the low pressure turbine 24.

As is well known in the art of gas turbines, incoming ambient air 30 becomes pressurized air 32 in the low and high pressure compressors 16 and 18. Fuel mixes with pressurized air 32 in combustor section 20, where it is burned. Once burned, combustion gases 34 expand through high and low pressure turbine sections 22, 24 and through power turbine section 26. High and low pressure turbine sections 22 and 24 drive high and low pressure rotor shafts 36 and 38 respectively, which rotate in response to the combustion products and thus rotate the attached high and low pressure compressor sections 18, 16. Power turbine section 26 may, for example, drive an electrical generator, pump, or gearbox (not shown).

Intermediate case (IMC) 40 is positioned between low pressure compressor section 16 and high pressure compressor section 18. IMC 40 defines a flow path for pressurized air 32 between low pressure compressor section 16 and high pressure compressor section 18. IMC 40 also provides structural support for gas turbine engine 10.

Figure 2:
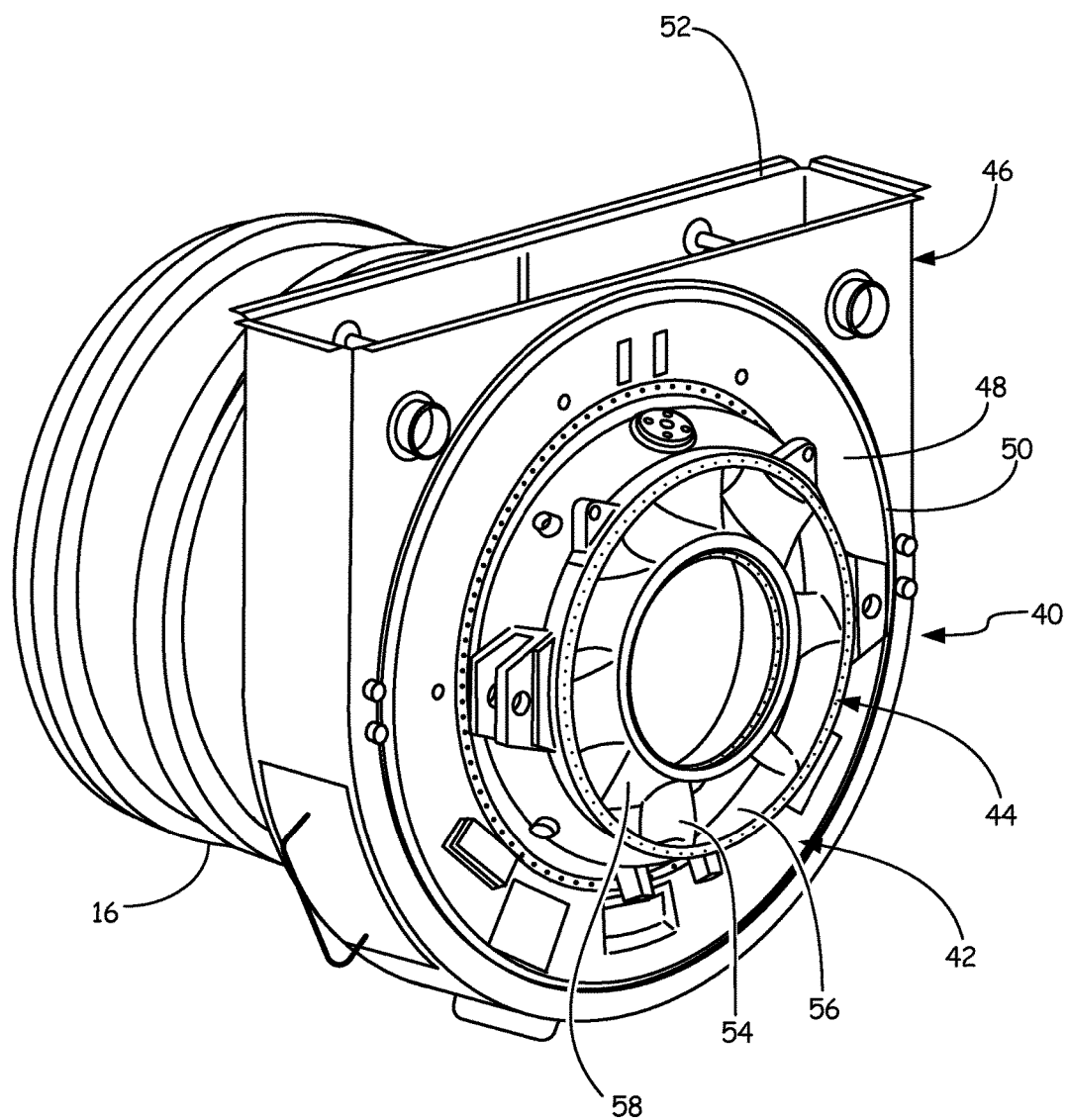
FIG. 2 is a perspective schematic view of a low pressure compressor and an intermediate case (IMC) of the industrial gas turbine engine of FIG. 1.

FIG. 2 is a perspective schematic view of low pressure compressor 16 and intermediate case (IMC) 40 of gas turbine engine 10 (shown in FIG. 1). IMC 40 is connected to low pressure compressor section 16 and is positioned downstream of low pressure compressor section 16. IMC 40 includes bleed duct 42 and IMC centerbody 44. In the illustrated embodiment, bleed duct 42 is a 2.5 bleed duct, connected to IMC centerbody 44 and is positioned upstream of IMC centerbody 44. Collector box 46 is connected to bleed duct 42 for receiving bleed air that passes through bleed duct 42. In the illustrated embodiment, collector box 46 is connected to rear flange 48 of bleed duct 42 via clamp 50. A second clamp (not shown) can connect collector box 46 to a forward portion of bleed duct 42 or to low pressure compressor section 16. Compressed air from low pressure compressor section 16 can flow through bleed duct 42 to collector box 46, and then out collector box outlet 52.

IMC centerbody 44 includes a plurality of struts 54 connecting outer diameter (OD) case 56 to inner diameter (ID) case 58. In the illustrated embodiment, eight struts 54 transfer load between OD case 56 and ID case 58 to provide structural support for gas turbine engine 10. Struts 54, OD case 56, and ID case 58 combine to define a flow path between low pressure compressor section 16 and high pressure compressor section 18 (shown in FIG. 1).

Figure 3:
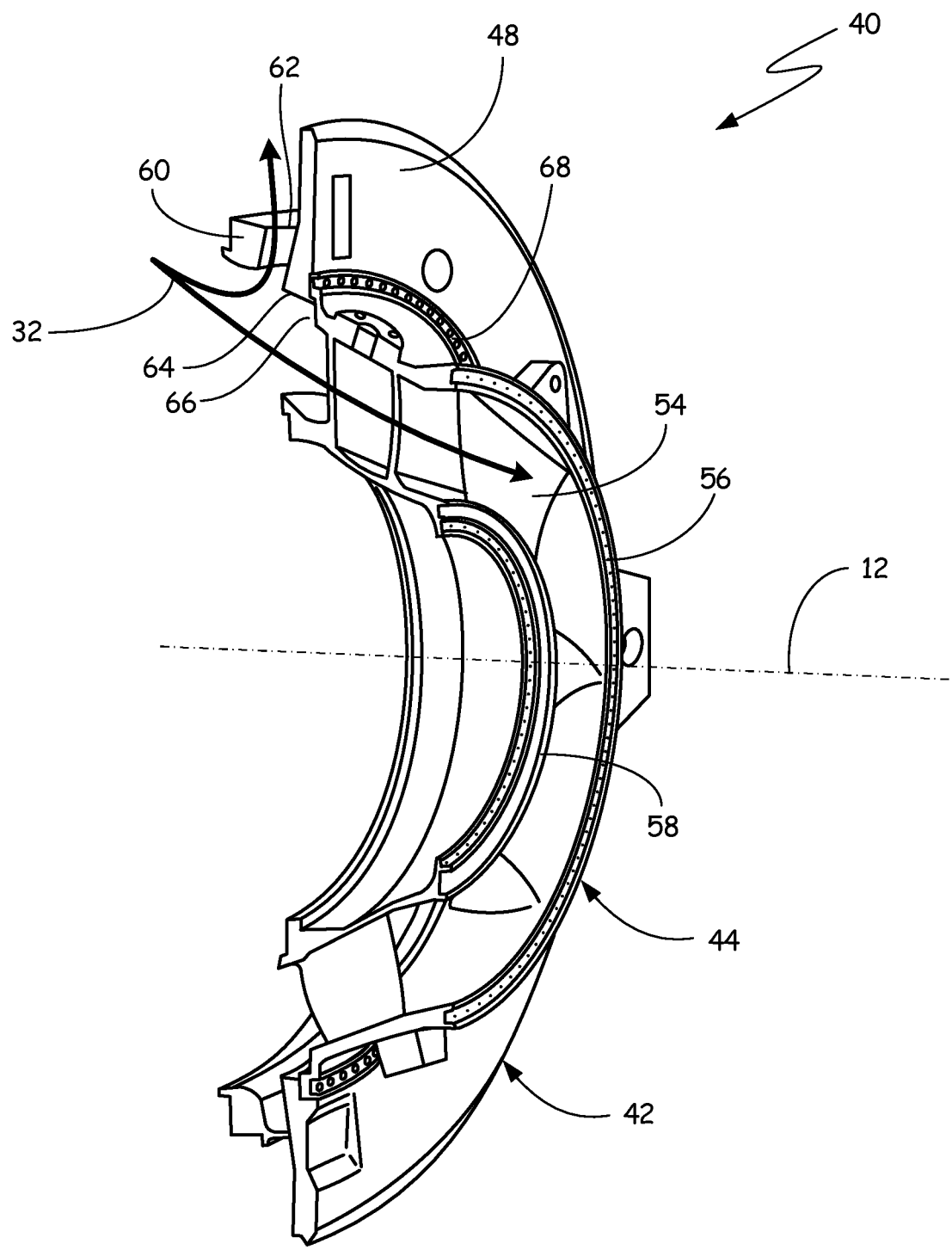
FIG. 3 is a perspective sectional schematic view of the intermediate case (IMC) of the FIG. 2.

FIG. 3 is a perspective sectional schematic view of intermediate case (IMC) 40. As shown in FIG. 3, bleed duct 42 includes front section 60 integrally formed with rear flange 48. Front section 60 extends forward in a substantially axial direction with respect to axial engine centerline axis 12. Rear flange 48 extends outward in a substantially radial direction with respect to axial engine centerline axis 12. A plurality of bleed duct outlets 62 extend radially outward through front section 60. Front section 60 of bleed duct 42 is an outer diameter flow path for flow of pressurized air 32 flowing in a substantially axial direction from bleed duct 42 to and through IMC centerbody 44. Pressurized air 32 also flows as bleed air in a substantially radial direction through bleed duct outlets 62 to collector box 46 (shown in FIG. 2).

Trailing edge 64 of bleed duct 42 connects to leading edge 66 of OD case 56 of IMC centerbody 44 via a plurality of bolts 68. During assembly, bleed duct 42 is connected to IMC centerbody 44 by first heating bleed duct 42, which causes bleed duct 42 to expand, and then positioning IMC centerbody 44 partially inside bleed duct 42 such that trailing edge 64 contacts leading edge 66. Then bleed duct 42 is allowed to cool so that it creates a tight interference fit between bleed duct 42 and IMC centerbody 44. Bolts 68 are then inserted through IMC centerbody and into bleed duct 42.

Figure 4A:
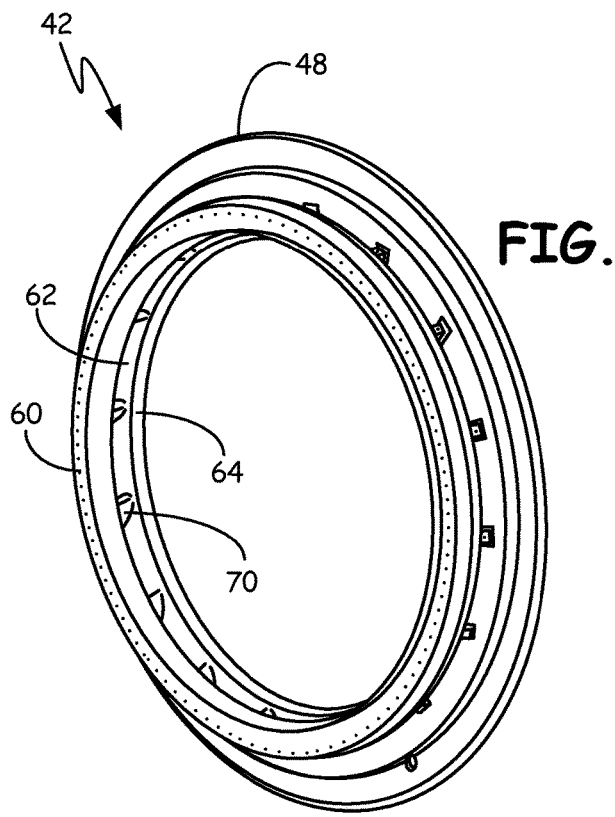
FIG. 4A is a perspective view of a front side of a 2.5 bleed duct of the intermediate case of FIG. 3.
Figure 4B:
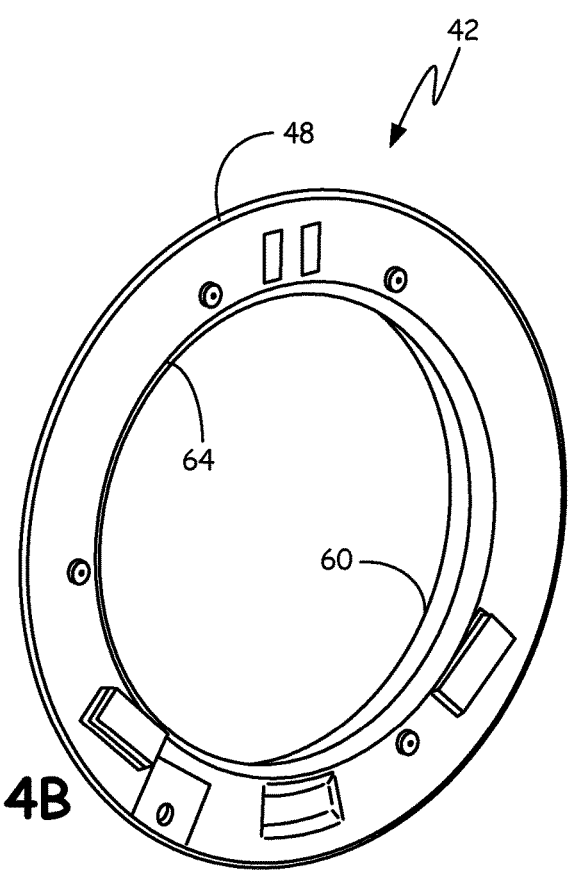
FIG. 4B is a perspective view of a rear side of the 2.5 bleed duct of FIG. 4.

FIG. 4A is a perspective view of a front side of bleed duct 42. As illustrated in FIG. 4A, bleed duct outlets 62 are separated by a plurality of ligaments 70. FIG. 4B is a perspective view of a rear side of bleed duct 42. FIGS. 4A and 4B illustrate bleed duct 42 separate from IMC centerbody 44 (shown in FIGS. 2 and 3). Because bleed duct 42 is separable from IMC centerbody 44, it can be formed separately from IMC centerbody 44 using different methods. In one embodiment, bleed duct 42 can be formed by sand casting. Sand casting is a metal casting process where sand is used as the mold material. A reusable pattern of bleed duct 42 can first be formed. Then sand is packed around the reusable pattern and solidified to form a sand mold. The reusable pattern is removed from the sand mold, which is then filled by a molten metal that solidifies and ultimately forms bleed duct 42. The sand mold can then be broken away and removed to expose bleed duct 42. This sand cast bleed duct 42 can then be machined, as necessary, to the final shape and finish that is suitable for bleed duct 42 to be used in gas turbine engine 10 (shown in FIG. 1). Bleed duct 42 can be sand cast using 17-4 stainless steel, or another metal suitable for the application. Sand casting can be a relatively efficient and cost effective method of forming a bleed duct 42, especially for embodiments of bleed duct 42 that are relatively large, such as those used in an industrial gas turbine engine such as gas turbine engine 10. In alternative embodiments, the above-described method of sand casting can be modified as appropriate for a particular application.

Figure 5:
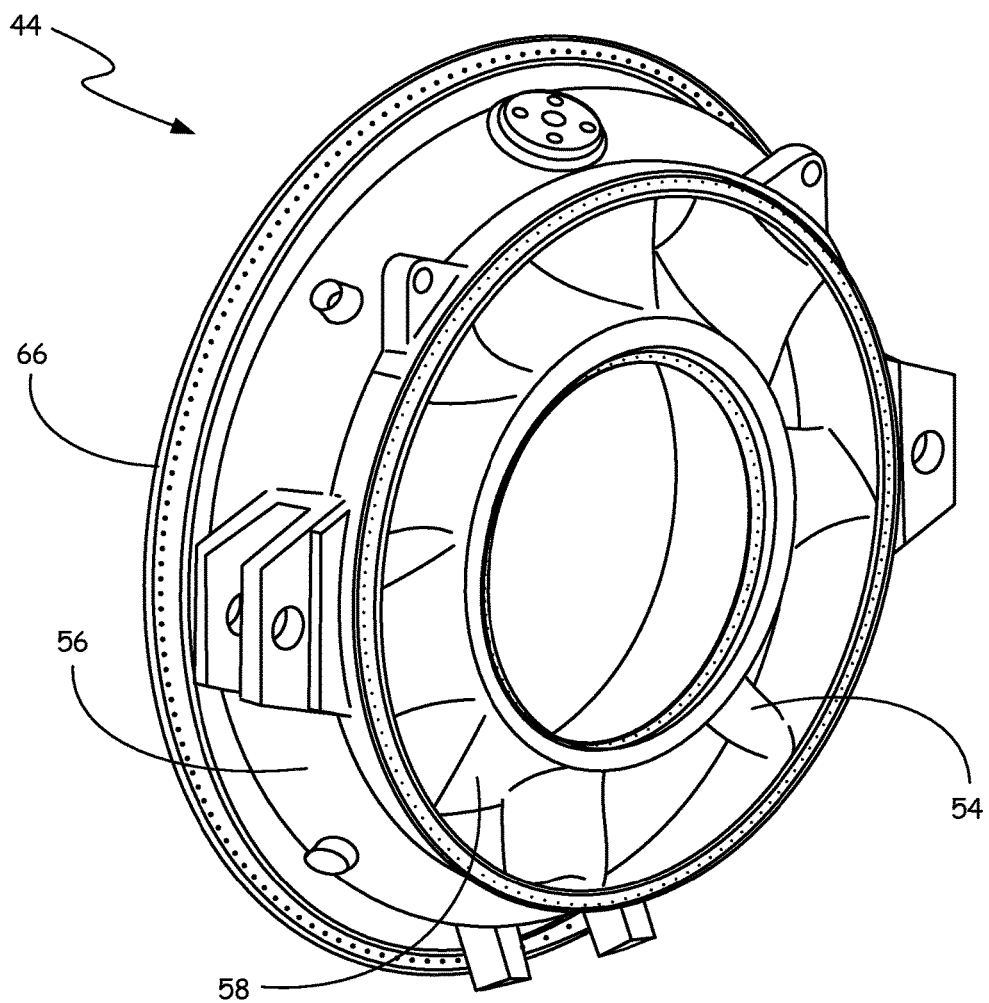
FIG. 5 is a perspective view of an IMC centerbody of the intermediate case of FIG. 3.

FIG. 5 is a perspective view of IMC centerbody 44. Because IMC centerbody 44 is separable from bleed duct 42, it can be formed separately from bleed duct 42 using different methods. In one embodiment, IMC centerbody 44 can be formed using investment casting. Investment casting is a metal casting process that can use single-use wax or plastic patterns. A single-use pattern of IMC centerbody 44 can first be formed. The pattern can be formed out of a polymer, using stereolithography whereby the pattern is formed by "printing" successive layers of ultraviolet curable polymer material and then cured via an ultraviolet laser. The pattern is then dipped into a ceramic material, which is then baked to create a hardened ceramic mold. The mold is heated to liquefy the polymer material inside the ceramic mold so that it drains out of the ceramic mold. The ceramic mold is then filled by a molten metal that solidifies and ultimately forms IMC centerbody 44. The ceramic mold can then be broken away and removed to expose IMC centerbody 44. In one embodiment, investment casting can form IMC centerbody 44 with its final shape and finish suitable for use in gas turbine engine 10 (shown in FIG. 1), without requiring any or substantial additional machining. IMC centerbody 44 can be investment cast using 17-4 stainless steel, or another metal suitable for the application. In alternative embodiments, IMC centerbody 44 can be formed of a substantially similar metal to that of bleed duct 42 other than 17-4 stainless steel. Investment casting can be more expensive than sand casting, but can produce molded parts with more precise dimensions and a smoother, higher quality surface finish than that of sand casting. Thus, investment casting IMC centerbody 44 allows for a relatively precise part to be manufactured without substantial additional cost and time machining IMC centerbody 44.

Thus, by forming the relatively large bleed duct 42 via sand casting and the relatively small IMC centerbody 44 via investment casting, the parts can be combined to form IMC 40 in a process that is relatively cost effective, efficient, and high quality. While this process can result in a relatively heavy IMC 40, for example such as about 1500 pounds (about 680 kilograms) or more, that weight can be acceptable in certain applications, such as in an industrial gas turbine engine where weight is of less concern. Such industrial gas turbine engines can be mounted on the ground or on a ship, as opposed to on a wing of an aircraft where excess weight can be particularly undesirable.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, the size, shape, and orientation of components in IMC 40 and elsewhere in gas turbine engine 10 can be different from those described and illustrated above so long as they are suitable for a given application.

Discussion of Possible Embodiments

The following are non-exclusive descriptions of possible embodiments of the present invention.

A gas turbine engine can include a first compressor, a second compressor, and an intermediate case (IMC) positioned between the first compressor and the second compressor. The intermediate case can include a bleed duct formed via sand casting and an IMC centerbody formed via investment casting and fixedly attached to the bleed duct.

The gas turbine engine of the preceding paragraph can optionally include, additionally and/or alternatively any, one or more of the following features, configurations and/or additional components:

the IMC centerbody can include an inner diameter case, an outer diameter case and a plurality of struts extending from the inner diameter case to the outer diameter case;

the bleed duct can be connected to the IMC centerbody via an interference fit and bolts;

the bleed duct can be a 2.5 bleed duct;

the gas turbine engine can be an industrial gas turbine engine;

a first turbine can be connected to the first compressor via a first shaft, a second turbine can be connected to the second compressor via a second shaft, and a power turbine positioned axially aft of the first and second turbines;

the bleed duct can include a plurality of bleed duct outlets extending radially outward through the bleed duct; and/or a collector box can be connected to the bleed duct for receiving bleed air flowing through the bleed duct outlets.

An intermediate case (IMC) for use in a compressor section of a gas turbine engine can include a bleed duct and an IMC centerbody. The bleed duct can be formed via sand casting. The IMC centerbody can be formed via investment casting and be fixedly attached to the bleed duct.

The IMC of the preceding paragraph can optionally include, additionally and/or alternatively any, one or more of the following features, configurations and/or additional components:

the bleed duct and the IMC centerbody can be made of a substantially similar metal; and/or the bleed duct and the IMC centerbody can both be made of 17-4 stainless steel.

A method for forming an intermediate case (IMC) for use in a compressor section of a gas turbine engine can include forming a bleed duct via sand casting, forming an IMC centerbody by investment casting, and fixedly attaching the IMC centerbody to the bleed duct.

The method of the preceding paragraph can optionally include, additionally and/or alternatively any, one or more of the following features, configurations and/or additional steps:

forming the bleed duct via sand casting can include packing sand around a reusable pattern, solidifying the sand to form a sand mold, removing the reusable pattern from the sand mold, filling the sand mold with molten metal, and removing the sand mold after the molten metal solidifies;

the bleed duct can be machined after sand casting;

forming the IMC centerbody via investment casting can include dipping a single use pattern into a ceramic material, baking the ceramic material to form a ceramic mold, heating the ceramic mold to liquefy the single use pattern, filling the ceramic mold with molten metal, and removing the ceramic mold after the molten metal solidifies;

forming the IMC centerbody via investment casting can include forming the single use pattern out of a polymer material via stereolithography;

the bleed duct and the IMC centerbody can be formed of a substantially similar metal;

the bleed duct and the IMC centerbody can be formed of 17-4 stainless steel;

fixedly attaching the IMC centerbody to the bleed duct can include heating the bleed duct to cause the bleed duct to expand, positioning the IMC centerbody at least partially inside the bleed duct, and cooling the bleed duct to create an interference fit between the bleed duct and the IMC centerbody; and/or fixedly attaching the IMC centerbody to the bleed duct can include inserting bolts through the IMC centerbody and into the bleed duct after creating the interference fit.

The invention claimed is:

1. A gas turbine engine comprising:
   a first compressor;
   a second compressor;
   an intermediate case (IMC) positioned between the first compressor and the second compressor, the intermediate case comprising:
      a bleed duct formed via sand casting, wherein the bleed duct comprises:
         a front section extending upstream toward the first compressor in a substantially axial direction with respect to a centerline axis of the gas turbine engine;
         a trailing edge disposed downstream of the front section;
         a plurality of bleed duct outlets extending radially outward through the front section of the bleed duct and positioned axially upstream from the trailing edge; and
         a flange connected to the trailing edge, wherein the flange extends radially outward beyond the front section and beyond the plurality of bleed duct outlets relative a centerline axis of the gas turbine engine; and
      an IMC centerbody formed via investment casting and fixedly attached to the trailing edge of the bleed duct, wherein the IMC centerbody extends downstream from the trailing edge of the bleed duct.

2. The gas turbine engine of claim 1, wherein the IMC centerbody comprises:
   an inner diameter case;
   an outer diameter case; and
   a plurality of struts extending from the inner diameter case to the outer diameter case.

3. The gas turbine engine of claim 1, wherein the bleed duct is connected to the IMC centerbody via an interference fit and bolts.

4. The gas turbine engine of claim 1, wherein the bleed duct is a 2.5 bleed duct.

5. The gas turbine engine of claim 1, wherein the gas turbine engine is an industrial gas turbine engine.

6. The gas turbine engine of claim 5, and further comprising:
   a first turbine connected to the first compressor via a first shaft;
   a second turbine connected to the second compressor via a second shaft; and
   a power turbine positioned axially aft of the first and second turbines.

7. The gas turbine engine of claim 1, and further comprising:
   a collector box connected to the flange of the bleed duct for receiving bleed air flowing through the bleed duct outlets.

8. An intermediate case (IMC) for use in a compressor section of a gas turbine engine, the IMC comprising:
   a bleed duct, wherein the bleed duct comprises:
      a front section extending in a substantially axial direction with respect to a centerline axis of the gas turbine engine;
      a trailing edge disposed downstream of the front section;
      a plurality of bleed duct outlets extending radially outward through the front section of the bleed duct and positioned axially upstream from the trailing edge; and
      a flange connected to the trailing edge, wherein the flange extends radially outward beyond the front section and beyond the plurality of bleed duct outlets relative a centerline axis of the gas turbine engine; and
   an IMC centerbody fixedly attached to the trailing edge of the bleed duct.

9. The IMC of claim 8, wherein the bleed duct and the IMC centerbody are made of a substantially similar metal.

10. The IMC of claim 8, wherein the bleed duct and the IMC centerbody are both made of 17-4 stainless steel.

11. A method for forming an intermediate case (IMC) for use in a compressor section of a gas turbine engine, the method comprising:
   forming a bleed duct via sand casting, wherein the bleed duct comprises:
      casting a front section extending in a substantially axial direction with respect to a centerline axis of the gas turbine engine;
      casting a trailing edge disposed downstream of the front section;
      forming a plurality of bleed duct outlets extending radially outward through the front section of the bleed duct and positioned axially upstream from the trailing edge; and
      casting a flange connected to the trailing edge, wherein the flange extends radially outward beyond the front section and beyond the plurality of bleed duct outlets relative a centerline axis of the gas turbine engine;
   forming an IMC centerbody by investment casting; and
   fixedly attaching the IMC centerbody to the trailing edge of the bleed duct.

12. The method of claim 11, wherein forming the bleed duct via sand casting comprises:
   packing sand around a reusable pattern;

solidifying the sand to form a sand mold;
removing the reusable pattern from the sand mold;
filling the sand mold with molten metal; and
removing the sand mold after the molten metal solidifies.

13. The method of claim 11, and further comprising:
machining the bleed duct after sand casting.

14. The method of claim 11, wherein forming the IMC centerbody via investment casting comprises:
dipping a single use pattern into a ceramic material;
baking the ceramic material to form a ceramic mold;
heating the ceramic mold to liquefy the single use pattern;
filling the ceramic mold with molten metal; and
removing the ceramic mold after the molten metal solidifies.

15. The method of claim 14, wherein forming the IMC centerbody via investment casting further comprises:
forming the single use pattern out of a polymer material via stereolithography.

16. The method of claim 11, wherein the bleed duct and the IMC centerbody are formed of a substantially similar metal.

17. The method of claim 11, wherein the bleed duct and the IMC centerbody are formed of 17-4 stainless steel.

18. The method of claim 11, wherein fixedly attaching the IMC centerbody to the bleed duct comprises:
heating the bleed duct to cause the bleed duct to expand;
positioning the IMC centerbody at least partially inside the bleed duct; and
cooling the bleed duct to create an interference fit between the bleed duct and the IMC centerbody.

19. The method of claim 18, wherein fixedly attaching the IMC centerbody to the bleed duct further comprises:
inserting bolts through the IMC centerbody and into the trailing edge of the bleed duct after creating the interference fit.

* * * * *